US006658472B1

(12) United States Patent
Greaves et al.

(10) Patent No.: US 6,658,472 B1
(45) Date of Patent: Dec. 2, 2003

(54) COMMUNICATION SYSTEMS, FIREWALL DEVICES, AND COMMUNICATION METHODS

(75) Inventors: Warren J. Greaves, Boise, ID (US); Stephen Holmstead, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/536,961

(22) Filed: Mar. 28, 2000

(51) Int. Cl.[7] .............................................. G06F 15/173
(52) U.S. Cl. ........................ 709/225; 709/223; 709/224
(58) Field of Search .......................... 379/210; 713/201, 713/103; 709/206, 227, 225, 224, 223

(56) References Cited

U.S. PATENT DOCUMENTS

| 5,473,143 | A | * | 12/1995 | Vak et al. ..................... 235/380 |
| 5,742,905 | A | * | 4/1998 | Pepe et al. .................. 455/461 |
| 6,092,204 | A | * | 7/2000 | Baker ......................... 713/201 |
| 6,222,852 | B1 | * | 4/2001 | Gandy ......................... 370/463 |
| 6,401,123 | B1 | * | 6/2002 | Shields et al. ............... 709/227 |
| 6,411,685 | B1 | * | 6/2002 | O'Neal ..................... 379/88.14 |

FOREIGN PATENT DOCUMENTS

| EP | 0858201 A2 | 8/1998 |
| GB | 2323757 A | 9/1998 |
| WO | WO97/09672 A1 | 3/1997 |

OTHER PUBLICATIONS

HP JetSend™ Communications Technology, Section I: Architectural Overview, Hewlett–Packard Company (1997).
HP JetSend™ Communications Technology, Section II: Protocol Reference, Hewlett–Packard Company (1997).
HP JetSend™ Communications Technology, Section III: E–Material Specification, Hewlett–Packard Company (1997).

HP JetSend™ Communications Technology, Proxy Overview Application Note, Hewlett Packard Company (May 1999).

Jetsend™ Developers Conference Materials, pp. 1–24 (May 1999).

* cited by examiner

*Primary Examiner*—Kristine Kincaid
*Assistant Examiner*—Sindya Narayanaswamy

(57) ABSTRACT

Communication systems, firewall devices, and communication methods are presented. In one aspect, a communication system includes a first transport medium configured to communicate data; a second transport medium configured to communicate data; a firewall device configured to selectively permit communication of data intermediate the first transport medium and the second transport medium; a first communication device coupled with the first transport medium; a second communication device coupled with the second transport medium, wherein the first communication device and the second communication device are configured to establish a data connection comprising the first transport medium and the second transport medium and the firewall device, to negotiate one of a plurality of formats for data to be communicated after establishment of the data connection, to format data to be communicated responsive to the negotiation, and to implement communication of the data formatted responsive to the negotiation intermediate the first communication device and the second communication device using the data connection.

27 Claims, 5 Drawing Sheets

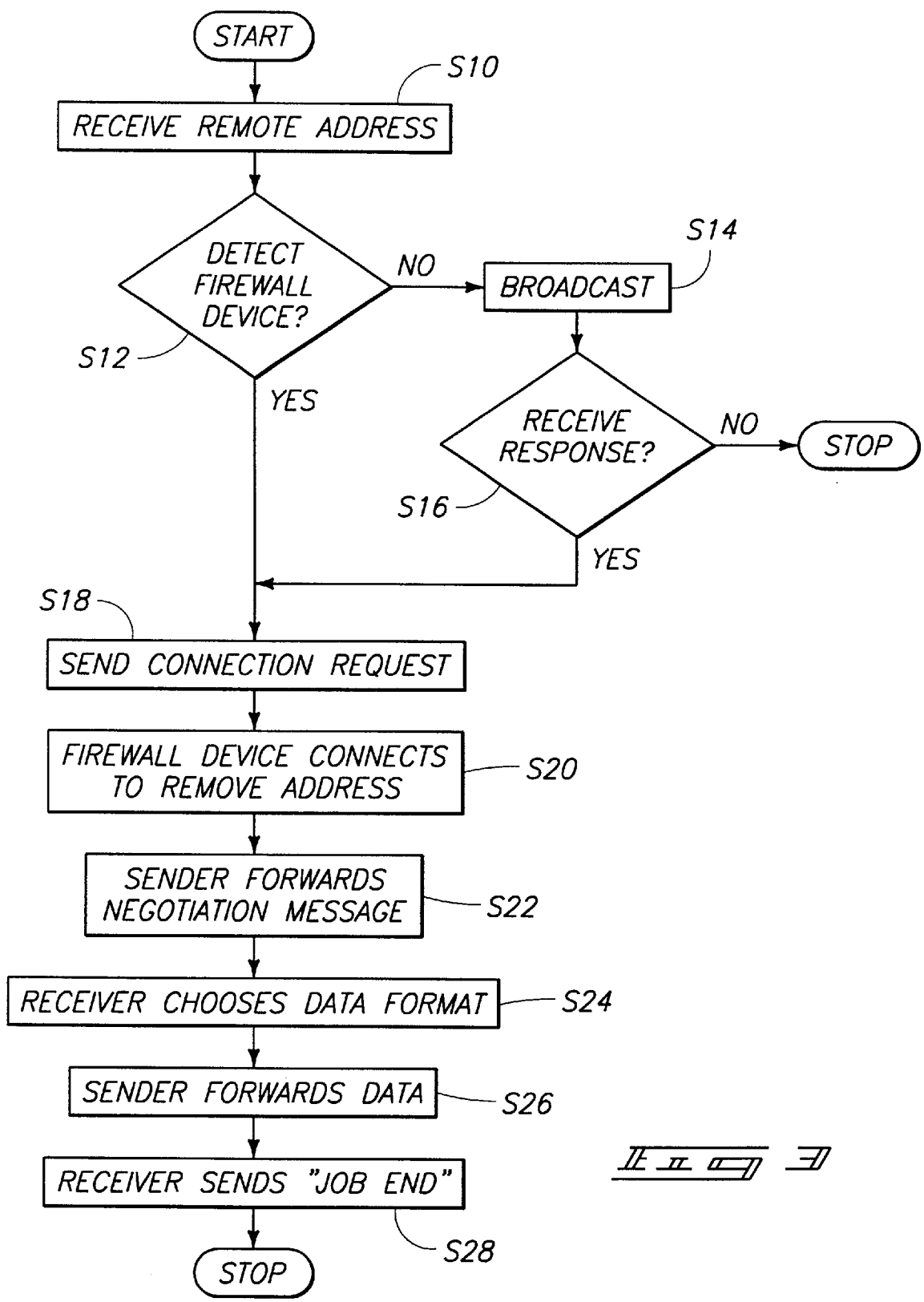

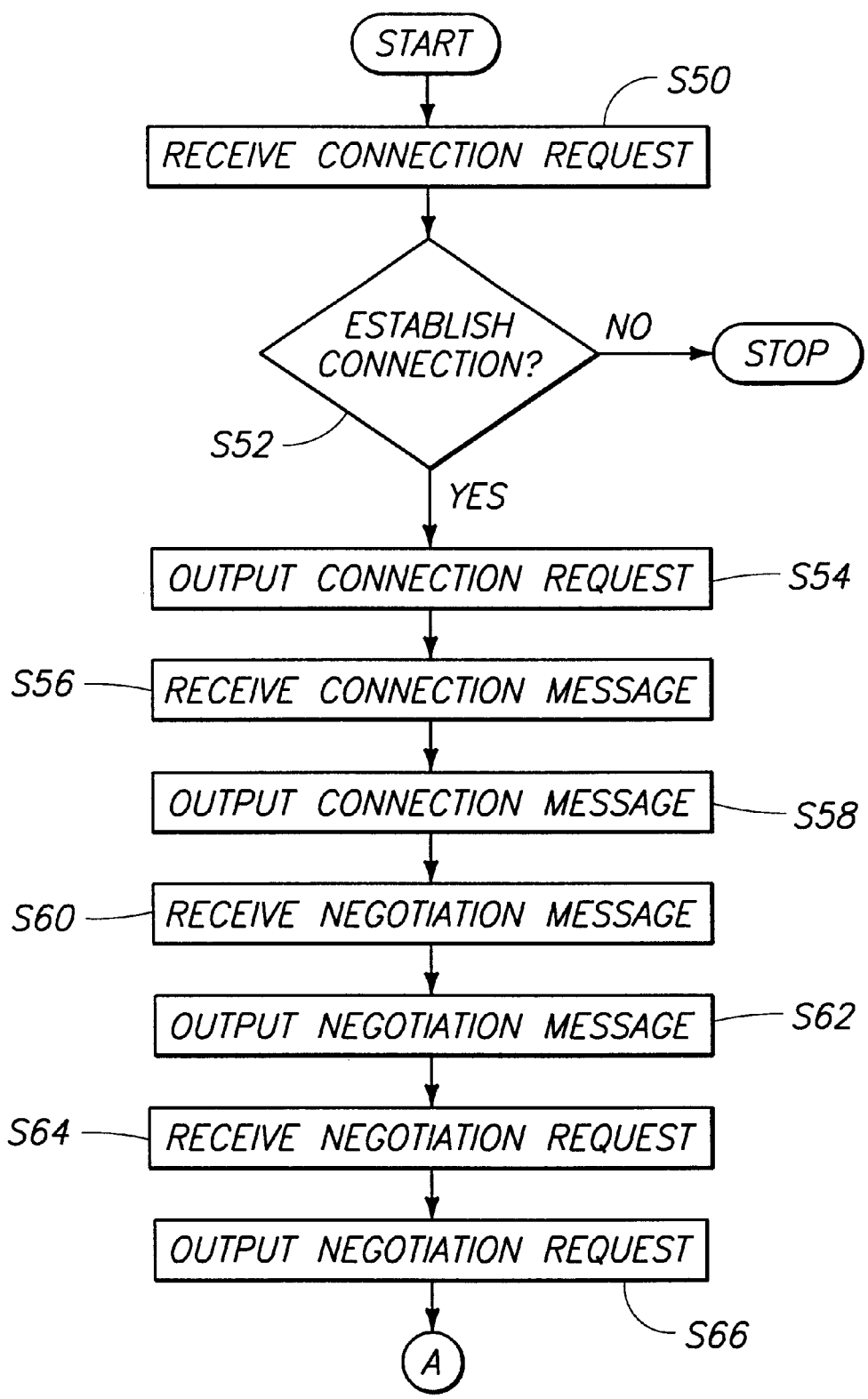

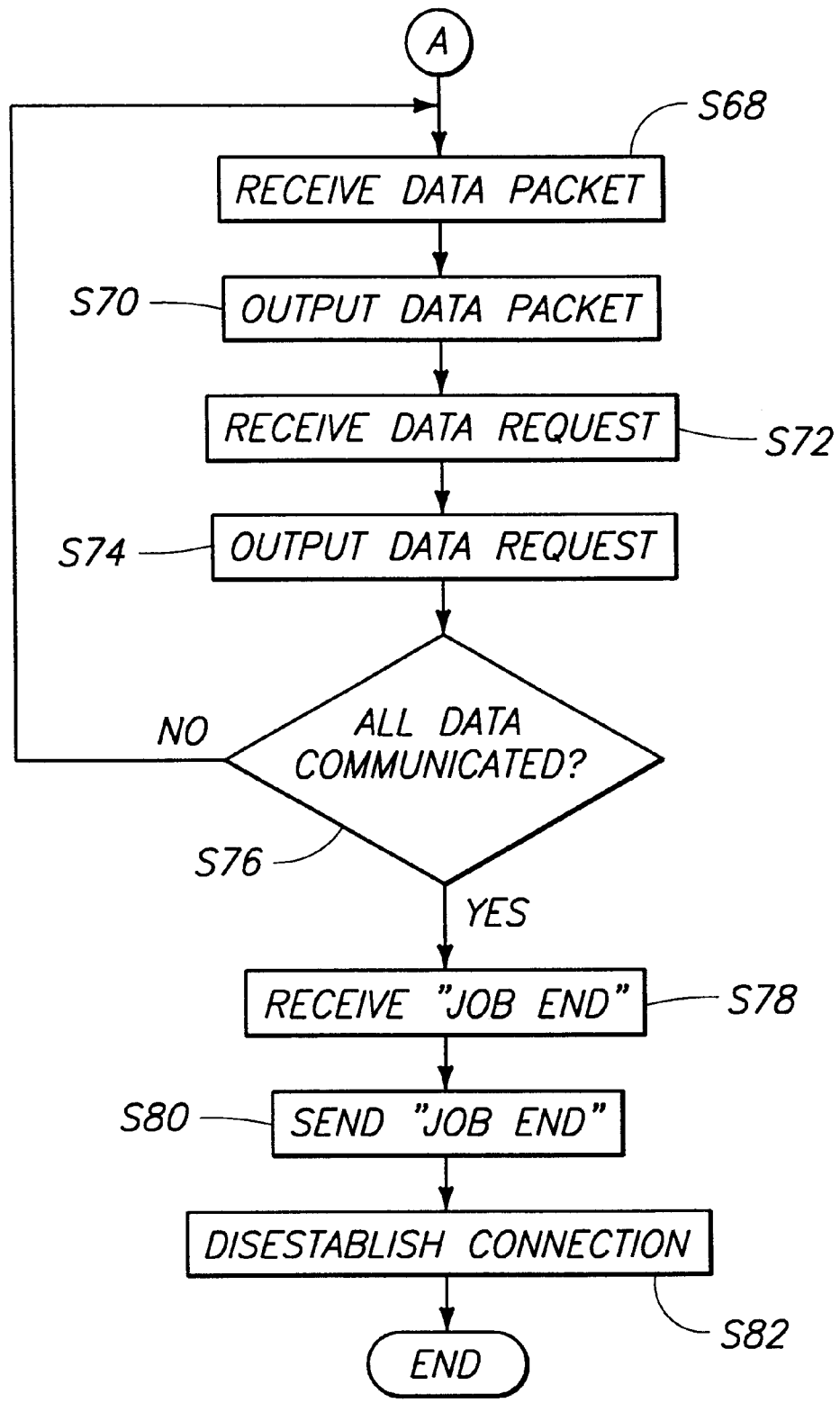

COMMUNICATION SYSTEMS, FIREWALL DEVICES, AND COMMUNICATION METHODS

FIELD OF THE INVENTION

The invention relates to communication systems, firewall devices, and communication methods.

BACKGROUND OF THE INVENTION

Network communications have increased in sophistication, data communication rates, and in other technology areas. For example, local area networks (LANs), wide area networks (WANs), and the Internet have facilitated communications between remote devices located throughout the world. Exemplary communicating devices include personal computers, work stations, printers, facsimile devices, etc.

Communication protocols have been introduced to efficiently transfer information in a quick, simple, and accurate manner. One exemplary communication protocol is Jet-Send™ which intelligently negotiates the best possible communication route and format of communicated data to effect communications between connected devices. Such is accomplished over a connection such as a network or infrared communications, for example. JetSend™ communication protocol utilizes a JetSend™ enabled device to capture documents and to send them to another JetSend™ enabled device. An exemplary sending device may be an HP digital sender and a receiving device may be, for example, an HP Color LaserJet™ Printer.

To facilitate communications on a worldwide basis, networks are often interconnected to enable one device of a given network to communicate with another device of another network. For example, a local area network of a first company may be connected to a local area network of a second company via the Internet. Accordingly, three networks including two local area networks and the Internet are utilized.

In numerous applications, firewalls are utilized between networks which are owned or operated by different entities. Exemplary firewalls include network nodes individually configured as a boundary to prevent the passage of traffic from one segment or network to another segment or network. Firewalls are typically used to improve network traffic as well as for security purposes. Exemplary firewalls are implemented within a router or within other dedicated specialized devices for such purposes. Currently, electronic mail access and Web access are available through conventional firewall configurations. The firewall access is typically restricted to such communications, including electronic mail and Web communications. There exists a need to provide communications having increased flexibilities intermediate different networks while maintaining the benefits afforded by firewalls.

SUMMARY OF THE INVENTION

The invention provides communication systems, firewall devices, and communication methods.

In one aspect of the invention, a communication system comprises a first transport medium configured to communicate data; a second transport medium configured to communicate data; a firewall device configured to selectively permit communication of data intermediate the first transport medium and the second transport medium; a first communication device coupled with the first transport medium; a second communication device coupled with the second transport medium, wherein the first communication device and the second communication device are configured to establish a data connection comprising the first transport medium and the second transport medium and the firewall device, to negotiate one of a plurality of formats for data to be communicated after establishment of the data connection, to format data to be communicated responsive to the negotiation, and to implement communication of the data formatted responsive to the negotiation intermediate the first communication device and the second communication device using the data connection.

In another aspect of the invention, a firewall device comprises a first interface adapted to couple with a first transport medium; a second interface adapted to couple with a second transport medium; a processor configured to permit communication of a connection request through a firewall intermediate the first transport medium and the second transport medium, to permit communication of a negotiation request intermediate the first transport medium and the second transport medium, and to permit communication of data intermediate the first transport medium and the second transport medium within one of a plurality of formats according to the negotiation request.

Another aspect of the invention provides a communication method comprising providing a first communication device coupled with a first transport medium; providing a second communication device coupled with a second transport medium; establishing a data connection intermediate the first communication device and the second communication device through a firewall intermediate the first transport medium and the second transport medium; negotiating one of a plurality of formats for data to be communicated using the first communication device and the second communication device after the establishing; formatting the data after the negotiating; and communicating the data intermediate the first communication device and the second communication device through the firewall after the formatting.

Other features and advantages of the invention will become apparent to those of ordinary skill in the art upon review of the following detailed description, claims, and drawings.

DESCRIPTION OF THE DRAWINGS

FIG. 3 is a flowchart illustrating an exemplary implementation of communications between the communication devices of FIG. 1.

FIG. 4a and FIG. 4b are a flowchart illustrating exemplary operations of the firewall device during communications.

DETAILED DESCRIPTION OF THE INVENTION

Reference is now made to one embodiment of Applicants' invention. An exemplary implementation of the invention is described herein with respect to the referenced drawings. While aspects of the invention are described via the disclosed embodiment, the description herein is not intended to limit the invention to this disclosed embodiment, but the invention is intended to cover alternatives, equivalents, and/or modifications such as are included within the scope of the appended claims.

Figure 1:
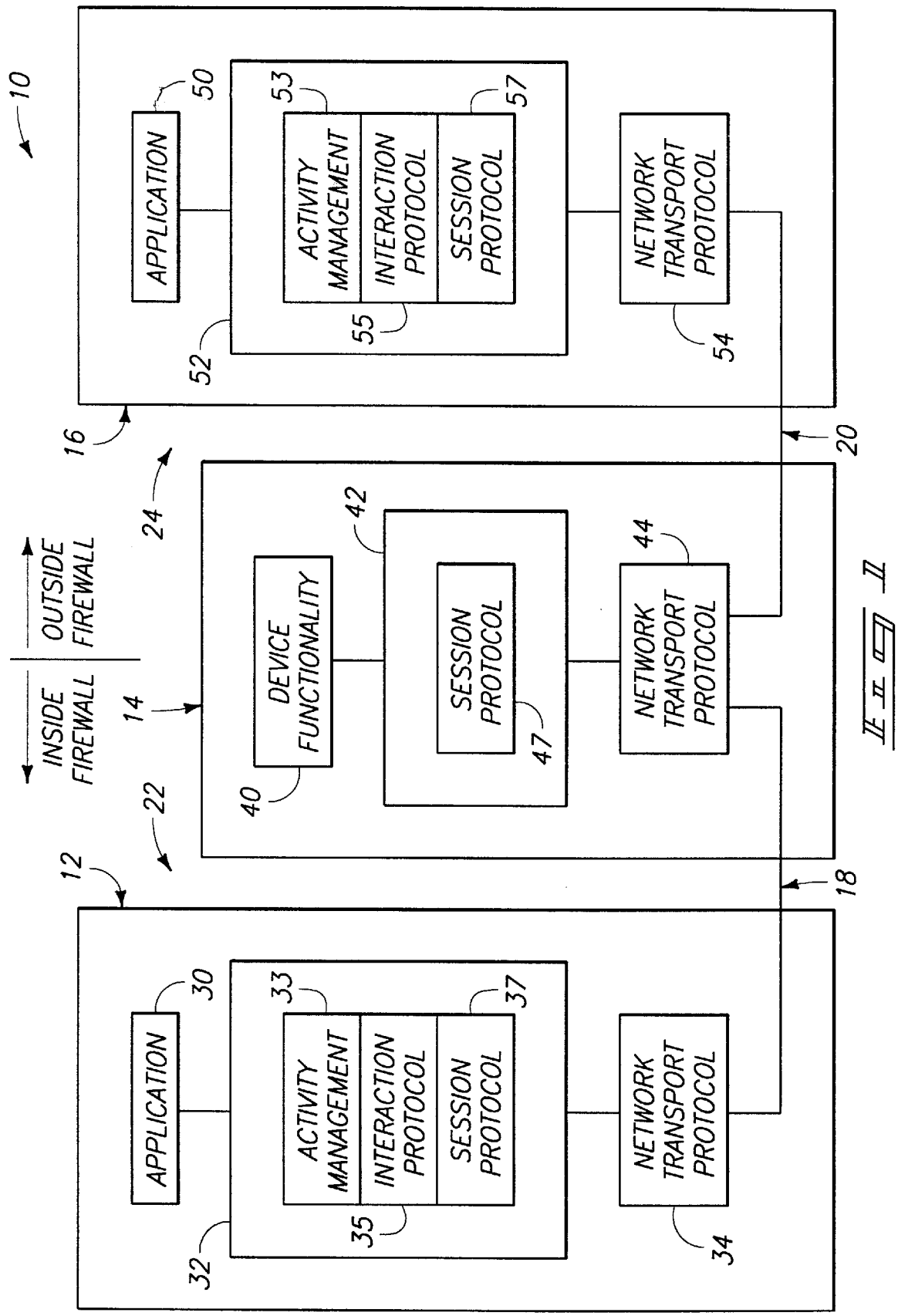
FIG. 1 is a protocol block diagram of an exemplary communication system implementing aspects of the present invention.

Referring to FIG. 1, an exemplary communication system 10 implementing aspects of the present invention is depicted. As shown, the depicted communication system 10 includes a communication device 12, a firewall device 14, a communication device 16, a transport medium 18, and a transport medium 20.

Transport media 18, 20 are individually configured to communicate data between the associated devices 12, 14, 16. In the described configuration, transport medium 18 provides a communications medium between communication device 12 and firewall device 14. Transport medium 20 provides a communications medium intermediate firewall device 14 and communication device 16. Transport media 18, 20 comprise wired or unwired (e.g., infrared, radio frequency) media in the described embodiment.

Transport medium 1 8 provides a first network 22 and transport medium 20 provides a second network 24 in the described configuration. Network 22 comprises a private, secure local area network (e.g., an internal corporate network) and network 24 comprises an open network (e.g., the Internet) in the illustrated arrangement. Other configurations of communication system 10 are possible including plural local area networks, wide area networks, open networks, etc.

Firewall device 14 couples networks 22, 24 and implements a firewall intermediate network 22 (and associated transport medium 18) and network 24 (and associated transport medium 20). For purposes of discussion herein, communication device 12 will be referred to as being inside the firewall and communication device 16 will be referred to as being outside the firewall. Accordingly, network 22 including communication device 12 is located inside the firewall and network 24 including communication device 16 is located outside the firewall. Additional networks (not shown) may also be coupled with firewall device 14.

Although individual networks 22, 24 are depicted as comprising singular respective communication devices 12, 16, such networks typically comprise a plurality of communication devices coupled with a common respective transport medium 18, 20. Exemplary communication devices include personal computers, workstations, scanners, printers, facsimile devices, and other devices configured to communicate utilizing the provided communications protocol, such as JetSend™ available from Hewlett-Packard Company. Further details regarding JetSend™ are described at http://www.jetsend.hp.com incorporated herein by reference.

In the described example, communication device 12 is referred to as a sending device, such as a scanner, and communication device 16 is referred to as a receiving device, such as a printer. Data is sent by communication device 12 to communication device 16 in the described configuration. In other configurations, communication devices 12, 16 comprise the receiving and sending communication devices, respectively. Communication devices 12, 16 implement bidirectional communications utilizing firewall device 14. An exemplary firewall device 14 comprises a proxy server including a common communication protocol such as JetSend™. The data format for communications is negotiated between the communicating devices according to such a communication protocol as described further below.

Exemplary transport media 18, 20 comprise respective packet-switched networks. Devices 12, 14, 16 are configured to communicate via transport media 18, 20 utilizing a network transport protocol, such as a datagram service or Transmission Control Protocol/Internet Protocol (TCP/IP) in exemplary configurations.

Firewall device 14 has access to both transport media 18, 20 and is coupled intermediate transport media 18, 20. Firewall device 14 provides secure, restricted access of open transport medium 20 to secure transport medium 18 in the presently described embodiment of the invention. In the described configuration, firewall device 14 permits communications within the data connection and excludes other communications from outside the firewall.

In particular, firewall device 14 is configured to selectively permit the communication of data intermediate transport medium 18 and transport medium 20. Firewall device 14 is also configured to prevent general access of communication devices outside of the firewall to communication devices within the firewall.

As mentioned, FIG. 1 comprises a protocol block diagram of communication device 12, firewall device 14, and communication device 16. As depicted, the described communication device 12 includes application code 30, a core communication protocol stack 32, and network transport protocol code 34. The illustrated firewall device 14 includes proxy functionality code 40, a core communication protocol stack 42, and network transport protocol code 44. The illustrated communication device 16 includes application code 50, a core communication protocol stack 52, and network transport protocol code 54.

In the described embodiment of the present invention, communications occur according to the provided communications protocol (e.g., JetSend™ standard sender to receiver protocol). JetSend™ provides a peer-to-peer protocol configured to implement communications between the same or different network configurations. Other communication protocols are utilized in other arrangements of the present invention.

To implement bidirectional communications intermediate communication devices 12, 16, firewall device 14 verifies initial sender data in the form of a connection request (e.g., verifies that data from communication device 12 is valid). Thereafter, firewall device 14 provides address routing functionality wherein the address of the appropriate receiving communication device is identified responsive to the connection request. For example, firewall device 14 locates the remote address of the receiving communication device (e.g., device 16). The firewall device 14 locates the appropriate destination or receiver address through use of an internal lookup table or by broadcasts to other firewall devices (not shown) on transport media 20 in exemplary configurations.

Following the location of the destination address or an address for another firewall device on transport media 20, communications intermediate communication devices 12, 16 then occur wherein firewall device 14 routes data of a job from inside the firewall (e.g., from communication device 12 and transport media 18) to outside the firewall (e.g., to transport media 20 and communication device 16).

In accordance with the JetSend™ standard, and as described in further detail below, a connection request, a connection message, a negotiation request, a negotiation message, data, and a "job end" designation are communicated intermediate communication devices 12, 16 to implement communications. Firewall device 14 communicates such communication protocol requests, messages, and data intermediate communication devices 12, 16 in the illustrated configuration.

More specifically, the sending communication device 12 initially outputs the connection request to establish a data connection between communication devices 12, 16. The receiving communication device 16 outputs the connection message to confirm receipt of the connection request and to establish the data connection. Firewall device 14 communicates the connection request and connection message intermediate communication devices 12, 16.

Thereafter, a negotiation of desired format of data (e.g., encoding type) occurs intermediate communication devices 12, 16 using the negotiation request and the negotiation message. In the described communication protocol, communication device 12 outputs the negotiation message to determine the proper format to communicate the data, which may be referred to as electronic or e-material. Communication device 16 communicates the negotiation request to establish the format for the data to be communicated. For example, communication device 12 outputs a plurality of possible formats within the negotiation message for which it can communicate the data. Exemplary possible data formats include different compression and resolution formats, such as JPEG at 600 dpi, RLE at 300 dpi, G4 at 200 dpi, etc. In addition, uncompressed data (e.g., 150–200 dpi) or other data formats may be communicated. Communication device 16 chooses a desired data format compatible with its own configuration and capabilities within the negotiation request. Firewall device 14 communicates the negotiation message and negotiation request intermediate communication devices 12, 16.

Following the negotiation, communication device 12 commences communication of the data in one or more data packet. Thereafter, communication device 16 further outputs the "job end" designation in accordance with the JetSend™ communication protocol to signify the completion of communications and the data connection between devices 12, 16 is closed or disestablished. Firewall device 14 communicates the data packet(s) and "job end" designation intermediate communication devices 12, 16 and closes the data connection.

In accordance with the described embodiment, firewall device 14 provides substantially transparent transfer of communications intermediate transport media 18, 20. In such a configuration, communication devices 12, 16 are unaware of the operations of firewall device 14. Communication devices 12, 16 communicate as though they were directly coupled with one another. In sum, firewall device 14 operations of transporting data and messages between opposite sides of the firewall are transparent to communication devices 12, 16.

Referring now specifically to exemplary operations of communication device 12, application code 30 is configured to provide raw data to core communication protocol stack 32. Alternatively, application code 30 receives data from core communication protocol stack 32. Application code comprises, for example, word processing code, spreadsheet code, etc.

Core communication protocol stack 32 of communication device 12 comprises activity management code 33, interaction protocol code 35, and session protocol code 37. Further details regarding stack components 33, 35, 37 are described in HP JetSend™ Communications Technology, Section I: Architectural Overview, Section II: Protocol Reference, and Section III: E-Material Specification (1997), all of which are incorporated herein by reference.

Network transport protocol code 34 is configured to implement communications from communication device 12 with transport medium 18. For example, network transport protocol code 34 implements datagram services and TCP/IP communications in exemplary configurations. In such an arrangement, network transport protocol code 34 utilizes datagram services to establish a connection with firewall device 14 and thereafter uses TCP/IP communications to communicate with communication device 16. Alternatively, communication device 12 utilizes TCP/IP communications to establish a connection with firewall device 14 and to implement communications with communication device 16 via transport media 18, 20.

Referring now to firewall device 14, device functionality code 40 comprises code for implementing standard operations (e.g., security procedures) of firewall device 14. For example, device functionality code 40 implements server functionality in embodiments wherein firewall device 14 comprises a proxy server.

Core communication protocol stack 42 of firewall device 14 comprises session protocol code 47.

Network transport protocol code 44 comprises code configured to implement communications of firewall device 14 with transport media 18, 20. For example, such network transport code 44 implements datagram services and/or TCP/IP communications in exemplary configurations.

Referring now to communication device 16, application code 50 provides device functionality (e.g., word processing, printer processing operations, etc.) corresponding to the given configuration of communication device 16.

Core communication protocol stack 52 comprises activity management code 53, interaction protocol code 55, and session protocol code 57.

Network transport code 54 provides communications with firewall device 14 and implements datagram services and/or TCP/IP communications in exemplary configurations.

Application code 30, core communication protocol stack 32, and network transport protocol code 34 are stored within communication device 12 in the described embodiment. For example, such code can be stored with an appropriate storage device (not shown) of communication device 12, including a hard disk drive, random access memory (RAM), and/or read only memory (ROM), for example. Application code 50, core communication protocol stack 52, and network transport protocol code 54 are stored within a similar appropriate storage device (not shown) of communication device 16 in the described embodiment. Details of firewall device 14 are described below.

The depicted configuration of communication system 10 is one possible example of numerous implementations of the present invention. Other configurations including numerous firewall devices 14 may be utilized to provide bidirectional communications through a plurality of respective firewalls (e.g., two firewall devices of respective companies providing access between a sending device within one company via that company's internal network and firewall device to the Internet through another firewall device and an internal network of the other company to the appropriate receiving device of the other company).

Figure 2:
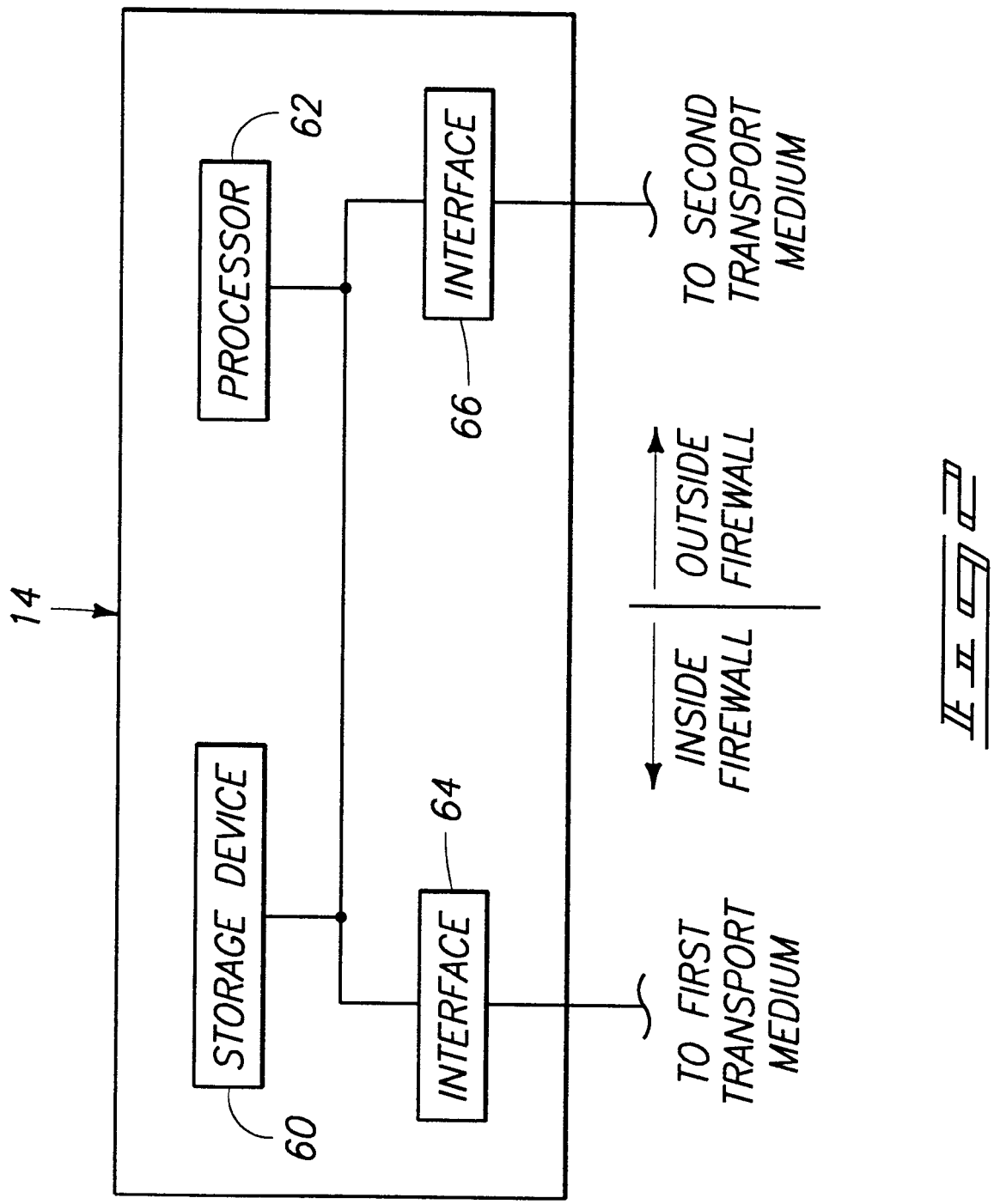
FIG. 2 is a functional block diagram of hardware components of an exemplary firewall device of the communication system shown in FIG. 1.

Referring to FIG. 2, a functional block diagram illustrates hardware components of an exemplary firewall device 14. The illustrated firewall device 14 comprises a storage device 60, a processor 62, and plural interfaces 64, 66. The depicted configuration of firewall device 14 is a proxy server. Other configurations of firewall device 14 are possible.

Storage device 60 is configured to store device functionality code 40, core communication protocol stack 42, and network transport protocol code 44 of FIG. 1. Storage device 60 can comprise one or more of a hard disk drive, random access memory, and/or read only memory configured to store software and/or hardware. Processor 62 comprises a digital microprocessor configured to execute software or firmware instructions within storage device 60 in one arrangement.

Interfaces 64, 66 are bi-directional interfaces individually internally connected with storage device 60 and processor 62 via a bidirectional bus for example. Further, interface 64 is configured to couple with first transport medium 18 inside the firewall in the described embodiment, and interface 66 is configured to couple with second transport medium 20 outside the firewall in the described configuration of communication system 10.

As previously described, communication devices 12, 16 are configured to establish the data connection comprising first transport medium 18, second transport medium 20, and firewall device 14. Following establishment of the appropriate data connection, communication devices 12, 16 negotiate one of a plurality of formats for data to be communicated. Thereafter, the sending communication device 12 formats the data to be communicated responsive to and in accordance with the negotiation. Communication devices 12, 16 implement communication of the data formatted responsive to the negotiation intermediate the first communication device and the second communication device using the established data connection. Following the appropriate communication of the data, the data connection is disestablished and communications through firewall device 14 with respect to the data connection cease.

Processor 62 of firewall device 14 is configured to provide access to networks and communication devices within the firewall and to permit communication of the connection request and message, negotiation request and message, data, and "job end" designation through the firewall intermediate transport media 18, 20 as described further in detail below.

Referring to FIG. 3, exemplary operations of communication system 10 are described.

Initially at step S10, a sending communication device receives the remote receiving address of the other communication device to implement communications. For example, the user inputs the appropriate remote address via a user interface (not shown) of the communication device.

Thereafter, the sending communication device checks for a locally configured firewall device at step S12.

If a locally configured firewall device is not determined at step S12, the sending communication device proceeds to step S14. If a firewall device is identified, the sending communication device proceeds to step S18.

At step S14, the sending communication device broadcasts a message within its respective network in an attempt to locate an appropriate firewall device at step S14.

At step S16, the sending communication device determines whether an appropriate response which identifies a proper firewall device was received. If not, the sending communication device issues an error message to the user. Otherwise, operations proceed to step S18.

At step S18, the sending communication device forwards a connection request to the detected firewall device using the appropriate network transport medium.

At step S20, the firewall device connects to the remote address of the receiving communication device identified in step S10 by the user. Such connection establishes a data connection intermediate the communication devices.

At step S22, the sending communication device forwards the negotiation message to the receiving or destination communication device through the firewall device.

At step S24, the receiving communication device chooses an appropriate data format. For example, the receiving communication device chooses compression, resolution, or other desired format to receive the data. Such desired data format is communicated through the firewall device to the sending communication device in the negotiation request.

Thereafter, the sending communication device formats the data in accordance with the chosen data format of step S24 and forwards the formatted data at step S26.

Following receipt of all data within the receiving communication device, such sends a "job end" message to the sending communication device to verify communications.

Referring to FIG. 4a and FIG. 4b, exemplary operations of firewall device 14 (FIG. 2) are described. Processor 62 of firewall device 14 implements the depicted flow chart steps responsive to executable instructions stored within storage device 60 in the described embodiment. The operations of the firewall device are transparent to the sending and receiving communication devices in the described configuration. Further details of firewall device 14 are described in HP JetSend™ Communications Technology, Proxy Overview Application Note (May 11, 1999), incorporated herein by reference.

Initially, the sending communication device forwards the communication request to the firewall device at step S50.

Thereafter, the firewall device attempts to establish the data connection at step S52 with the appropriate receiving communication device identified within the remote or destination address provided by the user. If no connection is established, the firewall device returns such failed attempt to the sending communication device.

Alternatively, operations of the firewall device proceed to step S54 wherein the firewall device outputs the connection request to the appropriate receiving communication device.

At step S56, the firewall device receives the connection message confirming the data connection from the receiving communication device responsive to the connection request.

At step S58, the firewall device outputs the connection message to the sending communication device.

Thereafter, the firewall device receives the negotiation message at step S60 from the sending communication device.

At step S62, the firewall device outputs the negotiation message to the appropriate receiving communication device.

Responsive to the negotiation message, the receiving communication device outputs the negotiation request which is received by the firewall device at step S64.

At step S66, the firewall device outputs the negotiation request to the sending communication device.

At step S68, the firewall device receives a data packet formatted by the sending communication device in accordance with the negotiation request.

At step S70, the firewall device outputs the received data packet to the receiving communication device.

At step S72, the firewall device receives a data request from the receiving communication device. The data request indicates whether further data is to be communicated.

The firewall device outputs the data request to the sending communication device at step S74.

At step S76, it is determined whether all data has been communicated according to the data request. Operations of firewall device return to step S68 if all the data has not been communicated. Otherwise, operations proceed to step S78.

The firewall receives a "job end" command from the receiving communication device at step S78.

At step S80, the firewall device forwards the "job end" command to the sending communication device.

At step S82, the firewall device disestablishes the data connection intermediate the sending communication device and the receiving communication device.

The protection sought is not to be limited to the disclosed embodiments, which are given by way of example only, but instead is to be limited only by the scope of the appended claims.

What is claimed is:

1. A communication system comprising:
   a first transport medium configured to communicate data;
   a second transport medium configured to communicate data;
   a firewall device configured to selectively permit communication of data intermediate the first transport medium and the second transport medium;
   a first communication device coupled with the first transport medium;
   a second communication device coupled with the second transport medium, wherein the first communication device and the second communication device are configured to establish a data connection comprising the first transport medium and the second transport medium and the firewall device, to negotiate one of a plurality of formats for data to be communicated after establishment of the data connection, to format data to be communicated responsive to the negotiation, and to implement communication of the data formatted responsive to the negotiation intermediate the first communication device and the second communication device using the data connection.

2. The system in accordance with claim 1 wherein the firewall device is configured to receive a connection request and to connect the first communication device and the second communication device responsive to the reception of the connection request to establish the data connection.

3. The system in accordance with claim 1 wherein the firewall device is configured to route the data intermediate the first communication device and the second communication device.

4. The system in accordance with claim 1 wherein the firewall device is configured to receive a connection request from one of the communication devices, to identify an address of the other communication device, and to forward the connection request to the other communication device to establish the data connection.

5. The system in accordance with claim 1 wherein the first transport medium and the second transport medium individually comprise a packet-switched medium.

6. The system in accordance with claim 1 wherein the first transport medium and the second transport medium individually comprise a TCP/IP medium.

7. The system in accordance with claim 1 wherein the firewall device is configured to disestablish the data connection.

8. The system in accordance with claim 1 wherein one of the first and the second communication devices is configured to offer the plurality of formats to the other of the first and the second communication devices, and the other of the first and the second communication devices is configured to select the one of the offered formats responsive to the offering to negotiate the one of the formats.

9. The system in accordance with claim 8 wherein the other of the first and the second communication devices is configured to automatically select the one of the offered formats without user input.

10. The system in accordance with claim 1 wherein the negotiation comprises communications outputted from both of the first and the second communication devices before the formatting.

11. The system in accordance with claim 1 wherein one of the first and the second communication devices comprises an originating device of content of the data, and the other of the first and the second communication devices comprises a first recipient device of the content of the data.

12. A firewall device comprising:
    a first interface adapted to couple with a first transport medium;
    a second interface adapted to couple with a second transport medium;
    a processor configured to permit communication of a connection request through a firewall intermediate the first transport medium and the second transport medium, to permit communication of a negotiation request intermediate the first transport medium and the second transport medium, and to permit communication of data intermediate the first transport medium and the second transport medium within one of a plurality of formats according to the negotiation request.

13. The device in accordance with claim 12 wherein the firewall device is configured to receive the connection request from a communication device coupled with one of the first transport medium and the second transport medium and to identify the address of another communication device coupled with the other of the first transport medium and the second transport medium.

14. The device in accordance with claim 12 wherein the firewall device is configured to connect the first communication device and the second communication device responsive to the reception of the connection request to establish the data connection.

15. The device in accordance with claim 12 wherein the first interface and second interface are configured to communicate with the first transport medium and the second transport medium individually comprising a packet-switched medium.

16. The device in accordance with claim 15 wherein the first interface and second interface are configured to communicate with the first transport medium and the second transport medium individually comprising a TCP/IP medium.

17. The device in accordance with claim 12 wherein the processor is configured to locate a communication device coupled with one of the interfaces responsive to the connection request.

18. The device in accordance with claim 12 wherein the processor is configured to permit communication of a negotiation message intermediate the second transport medium and the first transport medium, and to permit communication of the negotiation request responsive to the communication of the negotiation message.

19. A communication method comprising:
    providing a first communication device coupled with a first transport medium;
    providing a second communication device coupled with a second transport medium;
    establishing a data connection intermediate the first communication device and the second communication device through a firewall intermediate the first transport medium and the second transport medium;

negotiating one of a plurality of formats for data to be communicated using the first communication device and the second communication device after the establishing;

formatting the data after the negotiating; and communicating the data intermediate the first communication device and the second communication device through the firewall after the formatting.

20. The method in accordance with claim 19 wherein the establishing comprises establishing the data connection through the firewall using a firewall device.

21. The method in accordance with claim 20 further comprising routing the data intermediate the first communication device and the second communication device using the firewall device.

22. The method in accordance with claim 19 wherein the establishing comprises:

receiving a connection request within the firewall device from one of the first communication device and the second communication device;

identifying the other of the first communication device and the second communication device after the receiving; and forwarding the connection request to the other of the first communication device and the second communication device after the identifying.

23. The method in accordance with claim 19 wherein the communicating comprises communicating using a plurality of data packets.

24. The method in accordance with claim 23 wherein the communicating comprises communicating in accordance with TCP/IP communication protocol.

25. The method in accordance with claim 19 further comprising disestablishing the data connection after the communicating.

26. The method in accordance with claim 19 wherein the negotiating comprises offering the plurality of formats to one of the first and the second communication devices using the other of the first and the second communication devices, and automatically selecting the one of the offered formats responsive to the offering using the one of the first and the second communication devices without user input.

27. The method in accordance with claim 19 wherein the negotiating comprises outputting communications from both of the first and the second communication devices before the formatting.

* * * * *